United States Patent
Boudaud

(10) Patent No.: US 6,633,474 B1
(45) Date of Patent: Oct. 14, 2003

(54) SELECTIVE ELECTRONIC TRIPPING ELEMENT

(75) Inventor: Dominique Boudaud, Seyssins (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 09/868,045

(22) PCT Filed: Jan. 17, 2000

(86) PCT No.: PCT/FR00/00086

§ 371 (c)(1),
(2), (4) Date: Jun. 14, 2001

(87) PCT Pub. No.: WO00/51217

PCT Pub. Date: Aug. 31, 2000

(30) Foreign Application Priority Data

Feb. 25, 1999 (FR) .............................................. 99 02589

(51) Int. Cl.⁷ ................................................ H02H 3/00
(52) U.S. Cl. ............................ 361/95; 361/96; 361/97
(58) Field of Search ............................ 361/95, 63, 96, 361/97, 93.2

(56) References Cited

U.S. PATENT DOCUMENTS

| | | | | |
|---|---|---|---|---|
| 3,660,721 A | * | 5/1972 | Baird | 317/16 |
| 3,846,675 A | * | 11/1974 | Shimp | 317/33 |
| 4,240,123 A | * | 12/1980 | Hotta | 361/96 |
| 4,266,259 A | * | 5/1981 | Howell | 361/97 |
| 4,733,321 A | * | 3/1988 | Lindeperg | 361/96 |
| 4,767,996 A | * | 8/1988 | Jinzenji | 324/522 |
| 4,937,757 A | * | 6/1990 | Dougherty | 364/492 |
| 5,307,230 A | * | 4/1994 | MacKennzie | 361/96 |
| 6,137,665 A | | 10/2000 | Boudaud | |
| 6,377,431 B1 | * | 4/2002 | Jones | 361/96 |

FOREIGN PATENT DOCUMENTS

EP 0 872 939 10/1998

OTHER PUBLICATIONS

"Series Rating of Protective Devices" Kimblin et al., pp. 1–7, publication date May 1996.

* cited by examiner

Primary Examiner—Brian Sircus
Assistant Examiner—Zeev Kitov
(74) Attorney, Agent, or Firm—Parkhurst & Wendel, L.L.P.

(57) ABSTRACT

The instantaneous tripping threshold of the selective tripping device is a decreasing function of a quantity representative of the time necessary for the current to reach the peak value. The variation curve is disposed between first and second curves, obtained experimentally, representative of envelopes of the peak current values. The first curve is obtained when the circuit breaker associated to the selective tripping device is alone and the second curve when it is connected in series with another circuit breaker connected down-line.

9 Claims, 8 Drawing Sheets

SELECTIVE ELECTRONIC TRIPPING ELEMENT

BACKGROUND OF THE INVENTION

The invention relates to a selective electronic tripping device associated to a circuit breaker and comprising:

means for measuring the current flowing in the circuit breaker, processing means connected to the means for measuring the current and comprising means for determining a quantity representative of the peak value of the current, means for comparing said quantity with an instantaneous tripping threshold so as to provide an instantaneous tripping signal when said quantity exceeds said threshold.

Known electronic tripping devices comprise a processing unit, generally with a microprocessor, performing in particular long delay, short delay and instantaneous tripping functions. To achieve selectivity between two circuit breakers connected in series or cascading, it is known to provide a high rating for the up-line circuit breaker and a lower rating for the down-line circuit breaker. In this case the instantaneous tripping selectivity is of the current intensity type, the instantaneous tripping threshold of the down-line circuit breaker being lower than that of the up-line circuit breaker.

It is also known to use a time-based selectivity between two circuit breakers. In this case the tripping device of the up-line circuit breaker has a greater instantaneous tripping delay than the instantaneous tripping time of the tripping device of the down-line circuit breaker.

These two types of selectivity are not always efficient when short-circuit currents are very high, since high current thresholds are reached in both circuit breakers and a too long time delay of the associated tripping device would be liable to lead to premature wear of the contacts of the up-line circuit breaker.

To reduce these drawbacks a selective tripping device has been proposed, in particular in the document EP-A-128084, comprising a counter enabling the successive opening and closing cycles of the circuit breaker contacts in case of a short-circuit to be counted.

It has also been proposed, in particular in the document EP-A-872939, to disable an instantaneous tripping order if repulsions are detected for primary currents lower than a preset threshold.

Another type of selective instantaneous tripping, which will be described in greater detail with respect to FIGS. 3 and 4, uses one time delay when the current has exceeded a first, low, threshold, and a second, higher, threshold after this time delay.

In all known selective tripping devices, it is in practice necessary to wait for at least two short-circuit current peaks before making an instantaneous tripping decision. This leads to detrimental wear of the circuit breaker contacts.

OBJECT OF THE INVENTION

The object of the invention is to provide a selective tripping device not presenting these shortcomings. The selective tripping device according to the invention has to be faster than known selective tripping devices, while at the same time achieving selectivity with a down-line circuit breaker so as to reduce wear of the contacts as far as possible in the event of a short-circuit.

This object is achieved by the fact that the processing means comprise means for determining a second quantity, representative of the time necessary for the current to reach the peak value, and means for determining the instantaneous tripping threshold according to a decreasing function of the second quantity.

According to a development of the invention, the instantaneous tripping threshold varies according to the second quantity according to a curve disposed between first and second curves representative of envelopes of the peak values of the current, the first curve being obtained when the associated circuit breaker is not connected in series with another circuit breaker connected down-line and the second curve being obtained when the associated circuit breaker is connected in series with another circuit breaker connected down-line. The first and second curves are preferably determined experimentally.

The tripping device according to the invention thus enables the associated circuit breaker not to be opened for no purpose when the latter is connected in series with a down-line circuit breaker. However, in the absence of a down-line circuit breaker, the absence of the latter is detected in less than one current half-period, which enables the destructive effect of repulsion of the contacts in case of a short-circuit to be minimized.

BRIEF DESCRIPTION OF THE DRAWINGS

Other advantages and features will become more clearly apparent from the following description of particular embodiments, given as non-restrictive examples only and represented in the accompanying drawings in which.

DETAILED DESCRIPTION OF THE PREFERRED EMBODIMENTS

Figure 1:
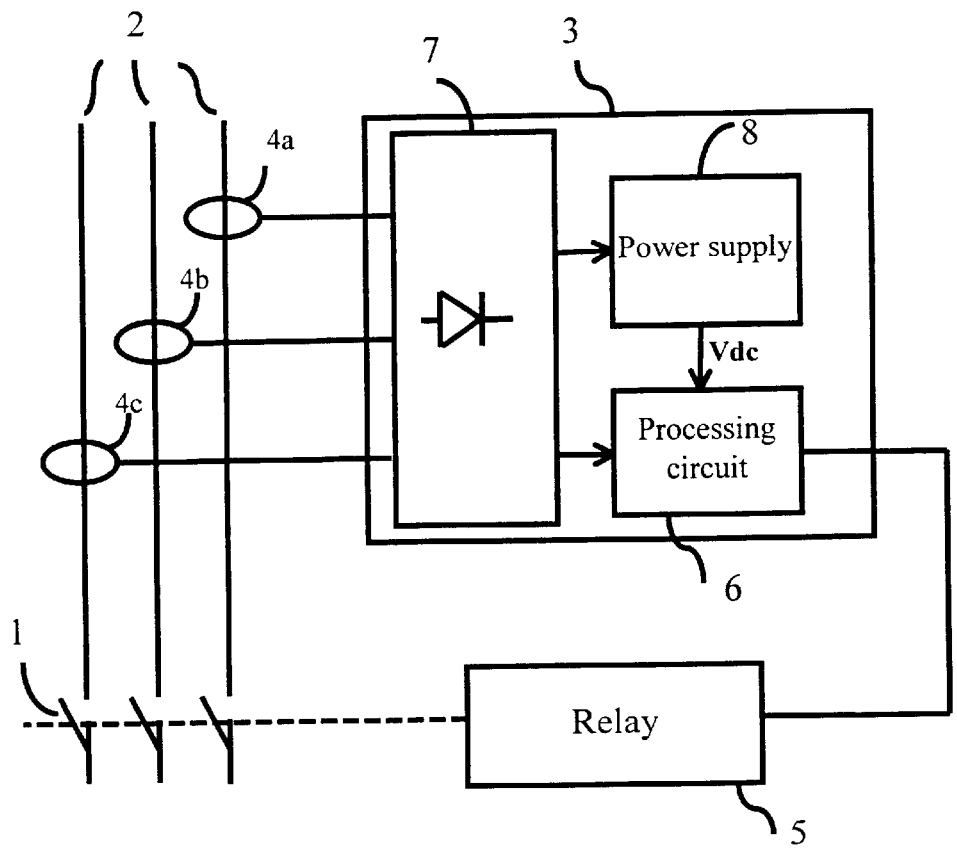
FIG. 1 represents, in block diagram form, a tripping device of known type wherein the invention can be implemented.

In FIG. 1, contacts 1 of a circuit breaker enable the current flow in the conductors of an electrical power system 2, a three-phase system in the particular embodiment represented, to be interrupted. An electronic tripping device associated to the circuit breaker comprises a processing unit 3 connected to current sensors 4a, 4b and 4c supplying signals representative of the primary currents flowing in the power system conductors. The processing unit 3 can perform various tripping functions and supplies a tripping signal, when required, to an opening relay 5 of the contacts 1 of the associated circuit breaker.

The processing unit 3 represented in FIG. 1 comprises a processing circuit 6, preferably a microprocessor-based circuit, receiving signals I representative of the measured currents, possibly via a shaping circuit 7. The latter circuit performs in particular rectifying of the signals supplied by the current sensors.

The processing unit also comprises a power supply circuit 8 which supplies the processing circuit with a suitable supply voltage Vdc. In the embodiment represented in FIG. 1, the tripping device is self-powered, i.e. the power supply circuit 8 is supplied by the current sensors 4a to 4c via the shaping circuit 7. The power supply Vdc disappears after opening of the circuit breaker.

Figure 2:
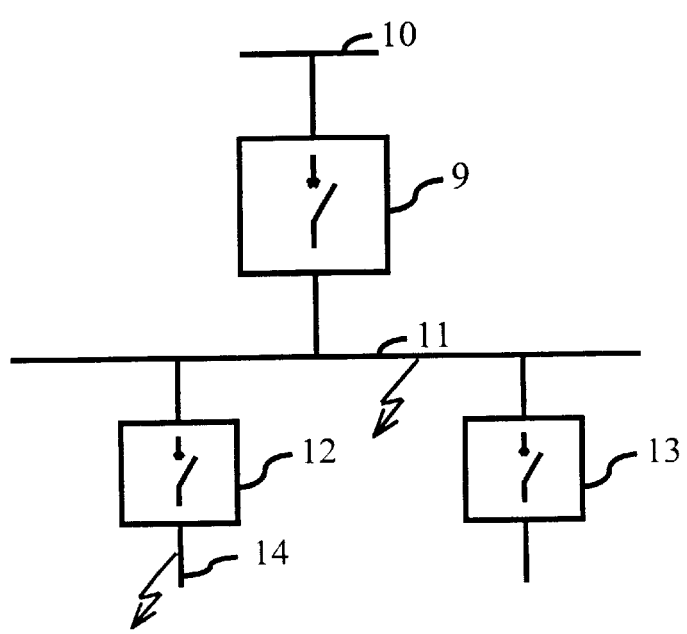
FIG. 2 schematically illustrates a particular embodiment of an electrical installation comprising circuit breakers connected in series wherein the tripping device according to the invention can be used.

The electrical installation represented in FIG. 2 comprises a first circuit breaker 9, or up-line circuit breaker, connected to a main line 10 and supplying a secondary line 11, itself connected to two down-line circuit breakers 12 and 13.

If a short-circuit occurs on a line 14 supplied by a down-line circuit breaker, the circuit breaker 12 in FIG. 2, the up-line circuit breaker 9 detects the fault. However it has to have a selective behavior and, in this case, must not trip immediately. The down-line circuit breaker 12 in fact also detects the fault, opens and annuls the short-circuit current. The selective up-line circuit breaker 9 no longer detects a fault, does not trip, and continues to supply other circuit breakers or apparatuses, such as the circuit breaker 13.

A short-circuit occurring on the line 11, supplied directly by the up-line circuit breaker 9, is detected only by the up-line circuit breaker 9. In this case, the up-line circuit breaker 9 has to trip as quickly as possible.

In the prior art, selectivity of the up-line circuit breaker is achieved, for example, by a selective tripping device, associated to the up-line circuit breaker and using a time delay. The operation of such a tripping device will be described briefly with reference to FIGS. 3 and 4.

The processing circuit 6 of the selective tripping device compares the current I with a low threshold Sb. When this threshold is reached, at a time t1 (FIG. 3), a time delay signal A changes value. For example, the signal A goes from 0 to 1 at the time t1 in FIG. 4. The signal A keeps this value, 1, during a preset time delay duration T then reverts to its initial value, 0, at a time t2. In a preferred embodiment, the time delay has a duration T=8.125 ms, for a power system operating at 50 Hz.

Figure 3:
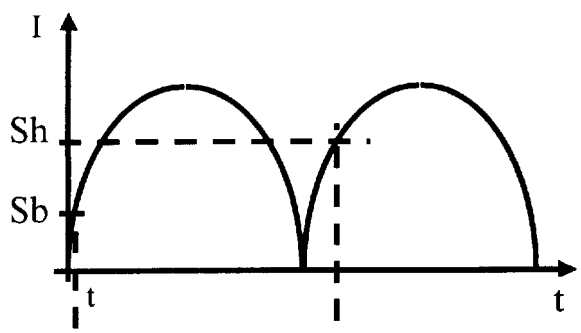
FIGS. 3 and 4 illustrate operation of a selective instantaneous tripping device, of known type, using a time delay.
Figure 4:
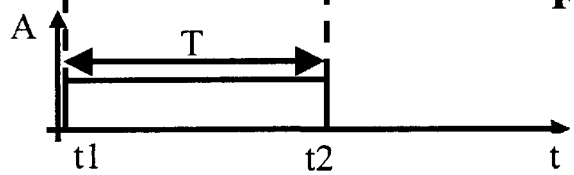

Throughout the duration of the time delay, the selective tripping device cannot trip. This does however enable a down-line circuit breaker, if there is one, to clear a fault during this time. At the end of the time delay, the selective tripping device compares the current I with a high threshold Sh>Sb. If a down-line circuit breaker has cleared the fault during the time delay, before the time t2, the current I measured by the selective tripping device does not exceed the threshold Sh. The fault may on the other hand not have been cleared at the time t2, either because there is no down-line circuit breaker, or due to malfunctioning of the latter, or because the fault does not affect the down-line circuit breaker (short-circuit on the line 11 of FIG. 2 for example). In this case, as represented in FIG. 3, the current I exceeds the high threshold Sh and the selective tripping device causes opening of the up-line circuit breaker. Tripping of the up-line circuit breaker has thus been delayed and this delay, which is for example about 14 ms, causes wear of the circuit breaker. The fault current flowing in the up-line circuit breaker is never broken before it has reached its peak value twice. In practice, depending in particular on the sampling frequency, it is even often necessary to wait for three passages via the peak value before opening of the up-line circuit breaker takes place.

The object of the invention is to eliminate this drawback. The selective tripping device according to the invention must be able not to trip if the down-line circuit breaker is present and to trip very quickly, in less than one half-period if the down-line circuit breaker is absent, so as to minimize the destructive effect of repulsion of the contacts of the up-line circuit breaker and to increase the number of breaking operations able to be performed by this circuit breaker, wherein the term "repulsion" describes a mechanical displacement of the circuit-breaker contacts due to a short-circuit current flowing in the circuit-breaker.

The invention takes certain particularities of the primary current flowing in the up-line circuit breaker in the event of a short-circuit into account.

Figure 5:
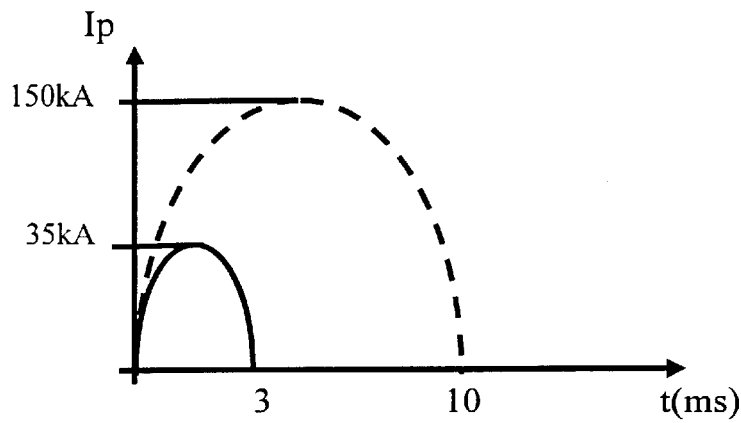
FIGS. 5 and 6 represent the variations, versus time, of the primary current Ip (unbroken lines) for two different values of the prospective short-circuit current (dotted lines), in a tripping device of known type having a certain limiting capacity.
Figure 6:
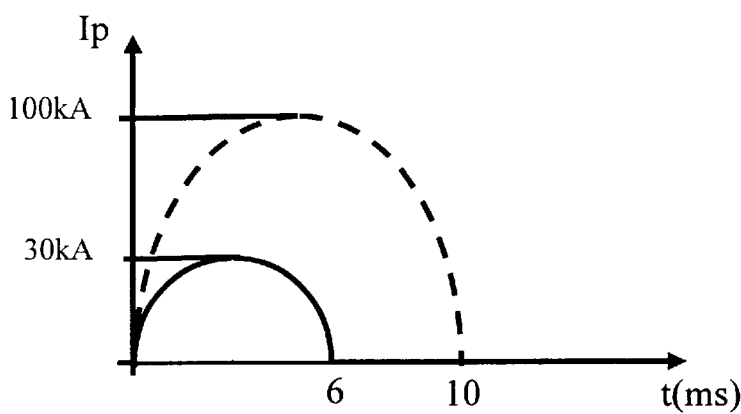

It is known that in the event of a short-circuit, a circuit breaker has a certain limiting capacity, more or less great depending on the type of circuit breaker. FIGS. 5 and 6 illustrate the variations, versus time, of the primary current Ip for two different values of the prospective short-circuit current. In FIG. 5, a prospective short-circuit current of 150 kA rms (dotted line) gives a limited current having a peak value of 35 kA and a duration of 3 ms. In FIG. 6 on the other hand, a prospective short-circuit current lower than the previous one, for example 100 kA rms (dotted line) generates a limited current having a peak value of 30 kA, slightly lower than the previous value, and a duration of 6 ms, greater than the previous duration.

Figure 7:
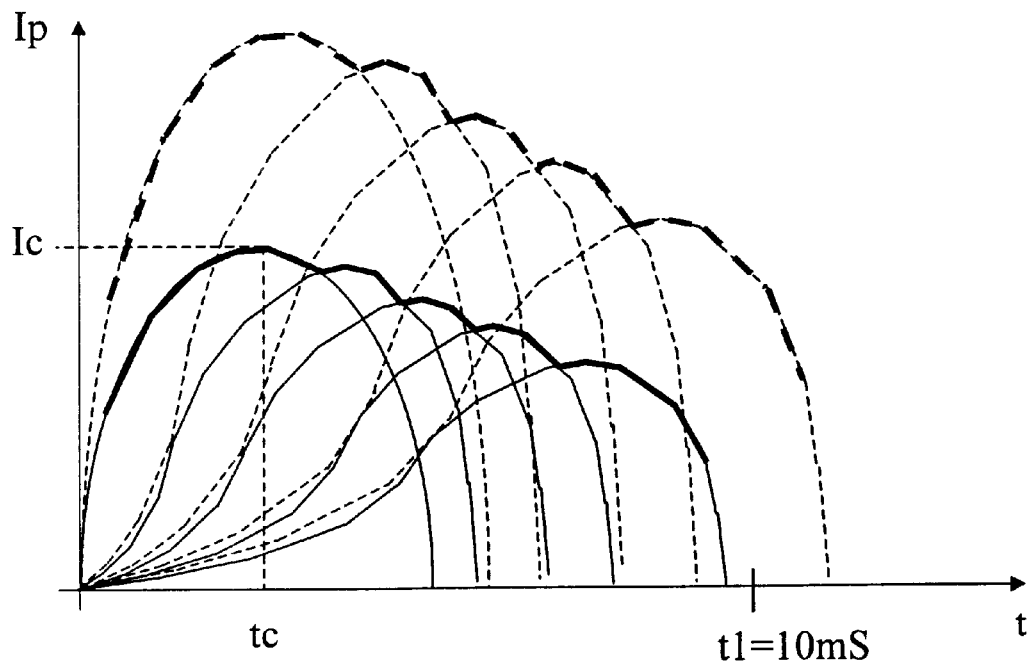
FIG. 7 represents two families of curves representative of the variations, versus time, of the primary current Ip, measured experimentally in a single circuit breaker (dotted lines) and, respectively, in a circuit breaker connected in series with another circuit breaker located down-line (unbroken lines).

FIG. 7 represents two families of curves obtained experimentally and representing the variations, versus time, of the primary current Ip in a circuit breaker in the event of a short-circuit. The experimental curves of FIG. 7 represent the actual variations of the primary current versus time, during a short-circuit (to be compared with the curves of FIGS. 5 and 6). The first family of curves, in dotted lines, corresponds to a single circuit breaker. The second family of curves, in unbroken lines, corresponds to the primary current flowing in the up-line circuit breaker when the short-circuit current flows in a down-line circuit breaker, with which the up-line circuit breaker is connected in series, resulting in interrupting the circuit by the down-line circuit breaker, of lower rating than the up-line circuit breaker, and limiting of the short-circuit current flowing in the two circuit breakers. Within each family of curves, the different curves are obtained for different values of the prospective short-circuit current and, as in FIGS. 5 and 6, the duration of the primary current increases when the amplitude of the first current peak decreases.

It can also be observed that, for the same prospective short-circuit current, the first peak occurs more quickly when the down-line circuit breaker has interrupted the circuit (unbroken line) than when the up-line circuit breaker is alone (dotted line). In FIG. 7 the envelopes of the peak values of the two families of curves have been represented in bold lines.

Figure 8:
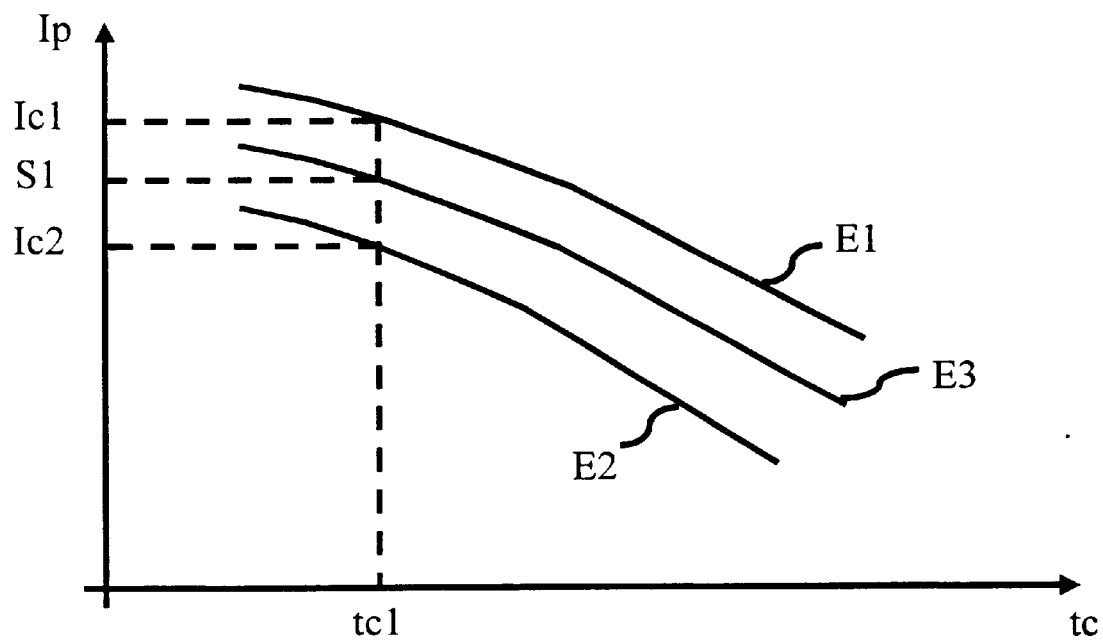
FIG. 8 represents the envelopes E1 and E2 of the peak values of two families of curves, respectively with a single circuit breaker and with two circuit breakers connected in series, versus the time tc when the first peak of the current Ip occurs, and a curve E3 representative of the instantaneous tripping threshold according to the invention.

Tests were carried out modifying, for each family of curves, both the prospective short-circuit current and the angle of closing (offset with respect to zero crossing) of the test, so as to take into account the different cases able to be envisaged for a short-circuit (amplitude, symmetrical, asymmetrical short-circuit, etc . . . ). In this way, the envelopes of the peak values Ic of two families of curves can be plotted for each circuit breaker, versus the time tc when the first current peak occurs. The experimental curves of FIG. 8 represent the envelopes of the peak values of the curves of FIG. 7 versus the time period tc, whereby tc corresponds, for each curve of FIG. 7, to the time period necessary to attain the first current peak lp (delay of its appearance), as shown on FIG. 7. In FIG. 8, the curve E1 corresponds to an envelope obtained with a single circuit breaker and the curve E2 to an envelope obtained with up-line and down-line circuit breakers connected in series. Two values of the peak current amplitude Ic are thus associated to a time tc1 when the first peak occurs, a first value Ic1 corresponding to the case where the circuit breaker is alone (curve E1) and a second value Ic2 corresponding to the case where the circuit breaker is connected in series with a down-line circuit breaker (curve E2). At each time tc1 when the first peak occurs, the second value Ic2 is lower than the first value Ic1.

The invention uses this property to enable the selective tripping device to differentiate, when a short-circuit occurs, between the case where the associated circuit breaker is alone and the case where it is connected in series with a down-line circuit breaker and to adapt its instantaneous tripping strategy accordingly.

For this purpose an instantaneous tripping threshold S is defined which is a decreasing function of the time tc when the current signal peak occurs. In FIG. 8, a curve E3 represents this function S(tc). The curve E3 is disposed between the curves E1 and E2. Thus a threshold value (S1) comprised between the associated values (Ic1, Ic2) of the curves E1 and E2—Ic2<S1<Ic1—corresponds to each value (tc1) of the time when the first peak occurs.

The distance between the curves E1 and E2 is all the larger the greater the difference between the circuit breaker ratings. This distance also increases with the limiting capacity of the down-line circuit breaker. The higher the limiting capacity of the down-line circuit breaker, the lower the corresponding peak values. An optimum difference is obtained with a down-line circuit breaker having a very good limiting capacity, and an up-line circuit breaker without any limiting capacity, the rating of the up-line circuit breaker being at least twice the rating of the down-line circuit breaker.

The values Ic are representative of the peak values of the primary currents. The selective tripping device in practice uses, in very conventional manner, the values measured by the current sensors.

Figure 9:
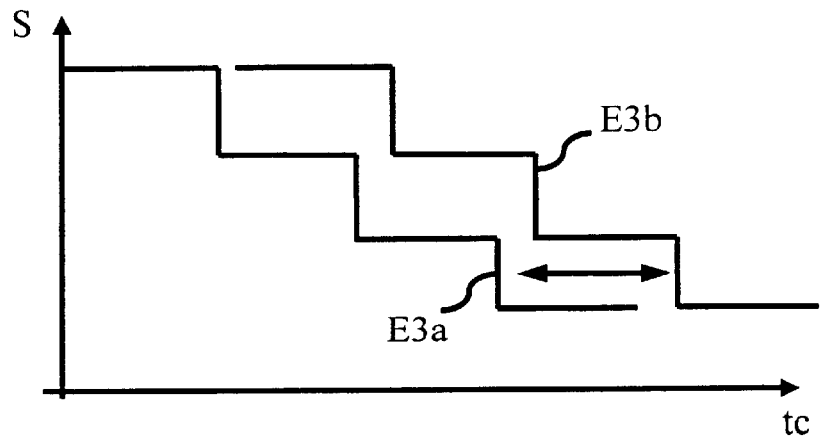
FIGS. 9 to 12 illustrate various embodiments of the curve representative of the value S of the instantaneous tripping threshold according to the invention versus the time tc necessary for the current to reach the peak value.
Figure 10:
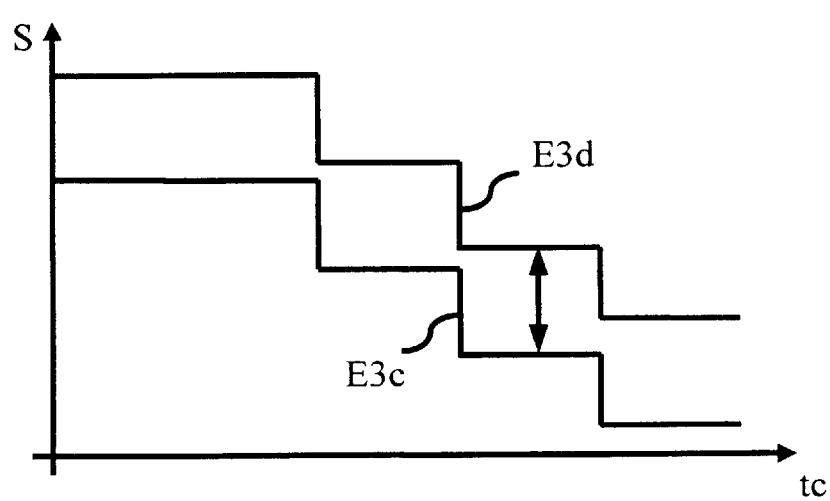

According to a first embodiment of the invention, the function S(tc) is a step-wise function, as represented in FIGS. 9 and 10. This type of function is more particularly suitable for storing in table form in a microprocessor-based tripping device.

In FIG. 9, two curves S(tc) are represented, the curve E3b being displaced along the time-axis with respect to the curve E3a. The curve E3a is used in self-powered tripping devices (FIG. 1) in which the processing circuit power supply is only provided via current sensors, i.e. when the processing unit is not powered beforehand. The curve E3b is used in the case where the tripping device is always supplied (prior power supply of the processing unit) for example by means of an auxiliary power supply (or when the circuit breaker was already operating at rated current at the time the short-circuit occurred).

In FIG. 10, a curve E3d is shifted in amplitude in a positive threshold S-direction with respect to a curve E3c.

For example purposes, the curve E3c is used in a tripping device associated with a circuit breaker of 250 A rating, whereas the curve E3d is associated with a circuit breaker of higher rating, for example 630 A. For the same value of the time tc, the threshold corresponding to the curve E3d is greater than the threshold corresponding to the curve E3c.

It is possible to provide a plurality of tables in the selective tripping device corresponding to the various possible options (with or without prior power supply, different ratings) and to validate the option chosen in the tripping device when performing installation thereof.

Figure 11:
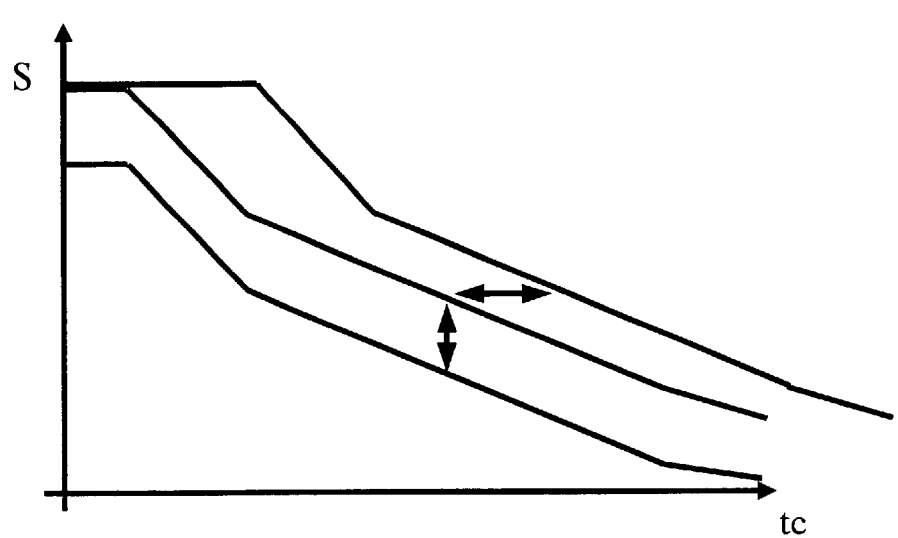

According to another embodiment of the invention (FIG. 11), the function S(tc) can be constituted by a plurality of segments of straight lines with different slopes. As in FIGS. 9 and 10, this function can be staggered in time or in amplitude according to the various possible options.

Figure 12:
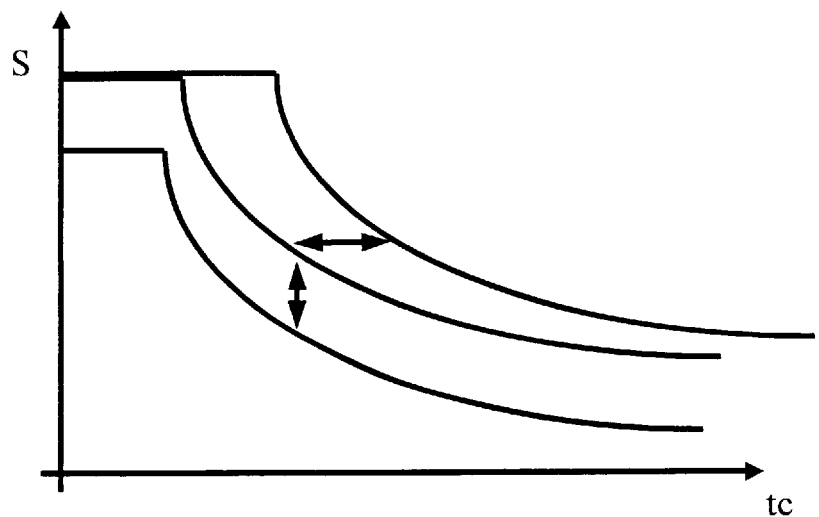

The same is the case for the embodiment of FIG. 12 in which the function S(tc) is obtained from a mathematical function. As FIGS. 9–12 show, the instantaneous threshold S(Tc) decreases when Tc is increasing, i.e., that a lower value of S(Tc) corresponds to a greater value of Tc.

Figure 13:
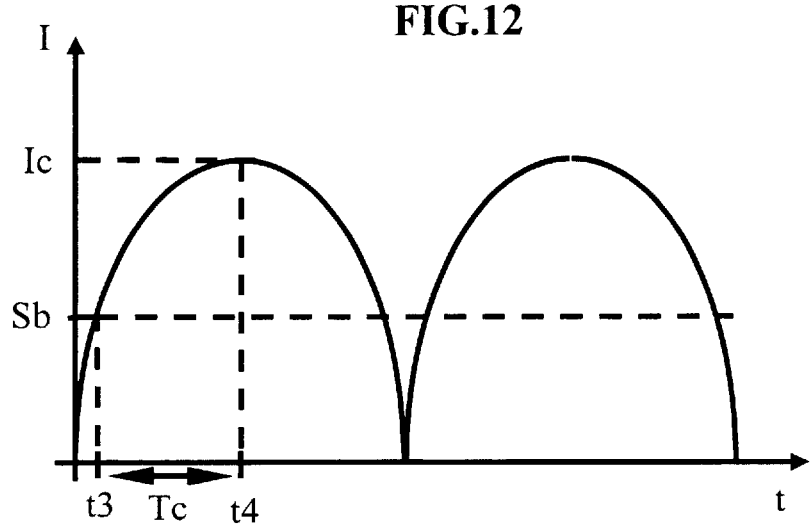
FIG. 13 represents the variations, versus time, of the current I measured in the tripping device according to the invention.

The operation of a particular embodiment of a tripping device according to the invention will be explained hereafter, with reference to FIG. 13 which represents the variations, versus time, of the current I supplied to the processing circuit 6 of the tripping device (in the absence of tripping).

In this particular embodiment, the processing circuit compares the current I with a low threshold Sb. As soon as this threshold is reached (time t3), the tripping device initializes counting of the time Tc necessary for the current I to reach its first peak value Ic (time t4). By using a predetermined curve S(tc) of the type defined above, the tripping device accordingly adapts the instantaneous tripping threshold to a value S(Tc). If, at the time t4, the current Ic exceeds the threshold S(Tc), the associated circuit breaker is considered to be alone and a tripping order is immediately generated. If on the other hand, at the time t4, the current Ic remains lower than the threshold S(Tc), then the tripping device considers that the associated circuit breaker is connected in series with a down-line circuit breaker and does not trip, the down-line circuit breaker then clearing the fault.

Thus, in the absence of a down-line circuit breaker, there is no time delay for tripping of the circuit breaker connected on its own and wear of this circuit breaker is thereby reduced. The no time delay decision being taken as soon as the first peak of the signal (t4) occurs, the number of breaks on short-circuit able to be performed by a circuit breaker can be increased from 2 or 3 in the prior art to 6 to 9 with the selective tripping device according to the invention.

Figure 14:
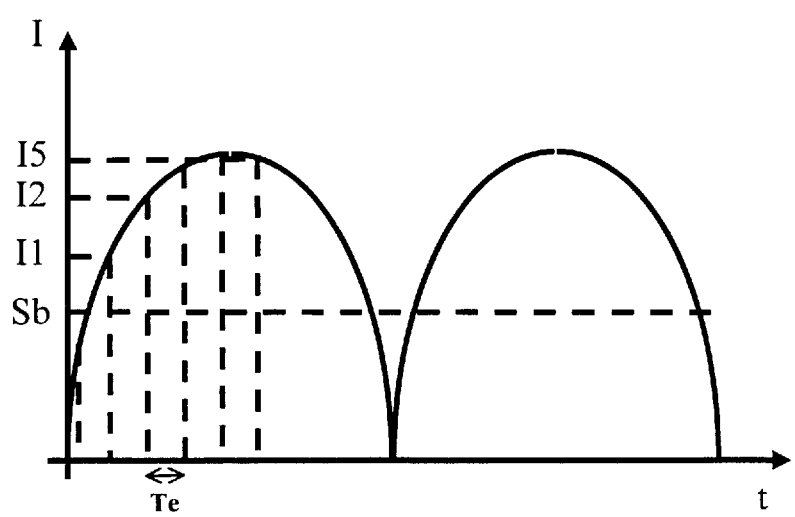
FIG. 14 is an alternative embodiment of FIG. 13 wherein the tripping device performs measurement of the current I by sampling.

According to a preferred embodiment, the processing circuit of the tripping device performs current measurement by sampling as represented in FIG. 14. The current is sampled with a preset sampling period Te.

Figure 15:
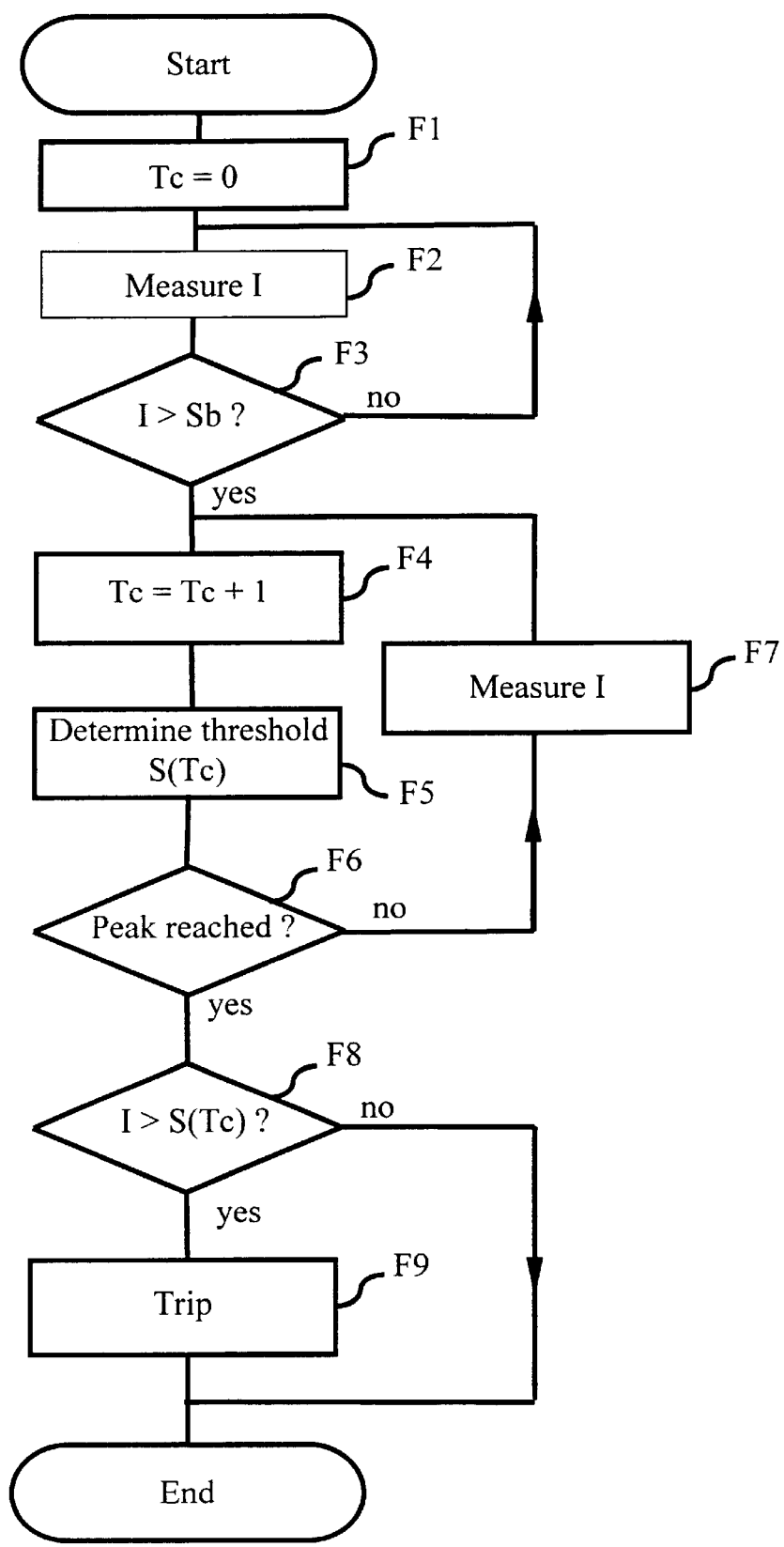
FIGS. 15 and 16 illustrate two alternative embodiments of a processing flowchart able to be used in a tripping device according to the invention.

According to the flowchart of FIG. 15, processing begins with an initialization step F1 during which the quantity Tc, representative of the time necessary for the current to reach the peak value, is reset to zero. Then the processing circuit performs (F2) measuring of a current sample. It then compares (F3) the amplitude of this sample with the low threshold Sb. If this amplitude is lower than or equal to Sb (no output of F3), the circuit goes back to step F2. If the threshold Sb has been reached (yes output of F3), the processing circuit increments (F4) the value of Tc:Tc=Tc+1. Thus when the amplitude of a first sample (I1 in FIG. 14) exceeds the threshold Sb, the quantity Tc takes the value 1. Then the processing circuit determines (F5) the value S(Tc) of the threshold associated to this value of Tc. It then examines (F6) whether the peak has been reached. If this is not the case (no output of F6), it performs (F7) a new measuring of I before returning to the step F4. At each new sample, the quantity Tc is incremented and the corresponding threshold determined. When the peak is reached (yes output of F6), the processing circuit compares the last sample with the threshold S(Tc). If the threshold is not exceeds (no output of F8), the processing is completed, the short-circuit being dealt with by the down-line circuit breaker. If on the other hand the threshold is exceeded (yes output of F8), the processing circuit triggers (F9) tripping of the circuit breaker.

Figure 16:
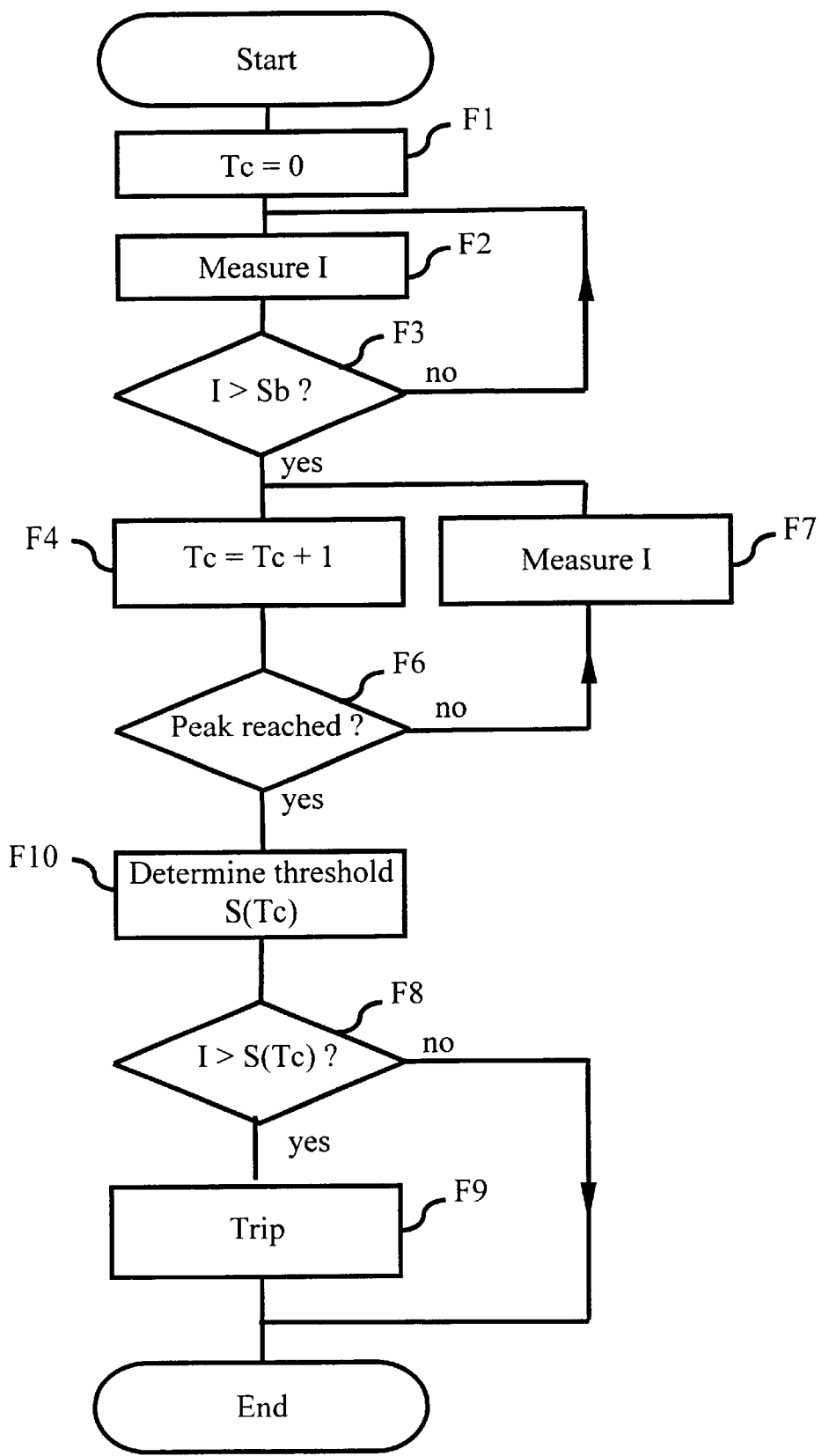

In the alternative embodiment represented in FIG. 16, the step F5 is eliminated and replaced by an equivalent step, F10, performed between the steps F6 and F8. Thus, in the first embodiment, the threshold is continuously adapted to the last value of the quantity Tc measured. In the second embodiment on the other hand, the threshold is only determined when the peak has been reached, which minimizes the processing time at each sample.

In a preferred embodiment, the peak is considered as being reached when the current value drops back, i.e. when the amplitude of the last sample is smaller than that of the previous sample. In FIG. 14, the amplitude of the $5^{th}$ sample ($I_5$) is smaller than that of the previous sample ($I_5<I_4$). The peak is therefore considered as being reached when the quantity Tc is equal to 5, which is representative of 5 times the sampling period Te. The threshold corresponding to this time is then used to make a decision to perform instantaneous tripping, if required.

Figure 17:
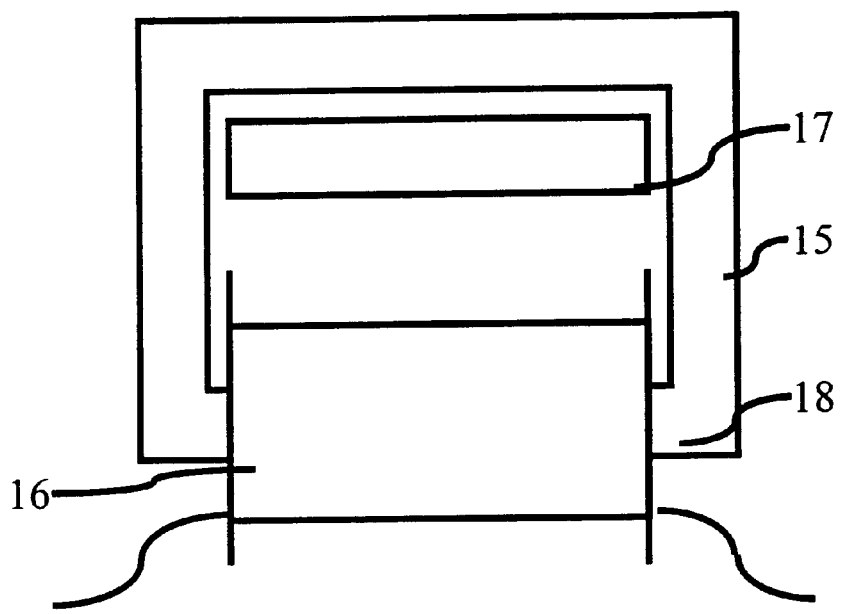
FIGS. 17 and 18 represent two particular embodiments, of known type, of a current sensor able to be used in a tripping device according to the invention.
Figure 18:
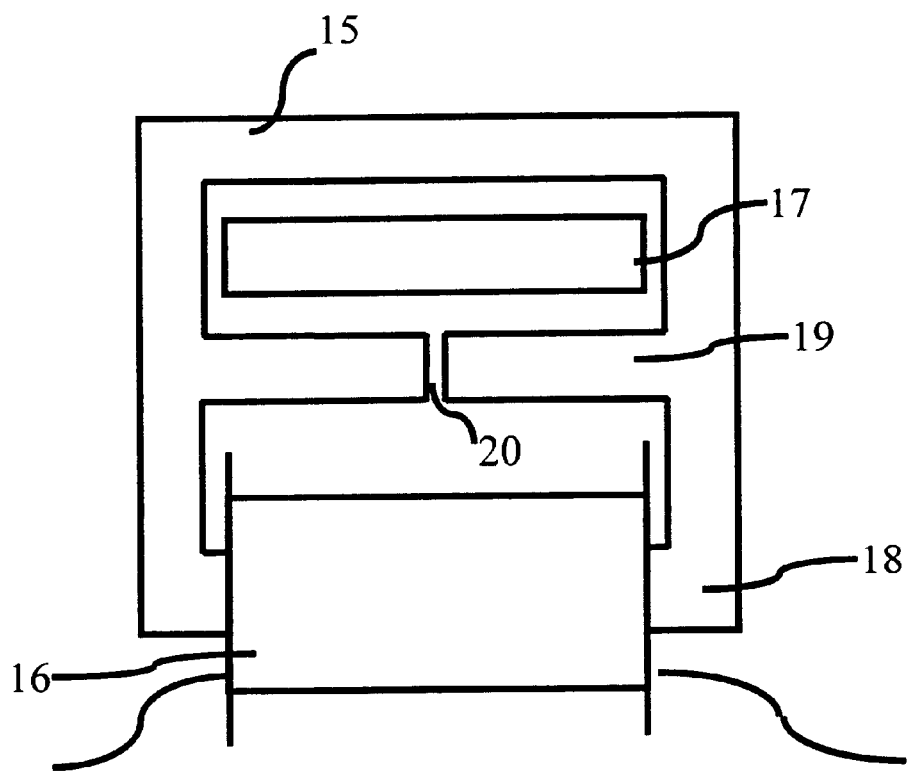

For the results obtained to be reliable the current supplied by a sensor has to be representative of the primary current. The lower the remanence of the sensor the less it saturates, and the more the results are reliable. FIGS. 17 and 18 represent two types of current sensor of known type fulfilling these conditions satisfactorily.

The current sensor according to FIG. 17 is a linear sensor. It comprises a magnetic circuit and a secondary winding formed by a coil 16. The magnetic circuit, generally formed by stacked plates, surrounds the conductor 17 of the power system where the primary current to be measured is flowing. A part 18 of the magnetic circuit 15 passes through the center of the secondary winding and forms the core of the coil 16.

The preferred embodiment of the current sensor represented in FIG. 18 is an iron sensor with shunt effect of the type described in the document EP-A-704867. It comprises a magnetic shunt 19, branch connected on the magnetic core of the secondary winding and comprising an air-gap 20. A current sensor of this kind presents in particular a lower remanence than that of other types of sensor, which makes it more reliable for measuring the first peak.

The invention is however not limited to a particular type of current sensor. Other types of linear current sensor can notably be used. For example Air current sensors, Iron current sensors, Hall effect current sensors, etc. can be used.

The invention applies equally well to a single-phase or a multi-phase power system. In the latter case, processing is performed separately for each phase.

The low threshold Sb (FIGS. 13 and 14) is preferably different from zero. The curves S(tc) are adapted to take account of the value of Sb chosen.

What is claimed is:

1. A selective electronic tripping device for a circuit breaker, said device comprising:
   current measuring means for measuring current flowing in a circuit breaker;
   processing means connected to the current measuring means and comprising first determining means for determining a first quantity representative of a peak value of such current;
   means for comparing said first quantity with an instantaneous tripping threshold for providing an instantaneous tripping signal when said first quantity exceeds said threshold; wherein
   said processing means further comprises second determining means for determining a second quantity representative of an amount of time necessary for such current to reach the peak value, and third determining means for determining the instantaneous tripping threshold according to a decreasing function of the second quantity.

2. The tripping device according to claim 1, wherein said processing means is for calculating the instantaneous tripping threshold according to the second quantity and predetermined values defining a threshold variation curve disposed between first and second curves representative of envelopes of the peak values of a current flowing in a circuit breaker, the first curve having been predetermined when a first circuit breaker associated with the tripping device was not connected in series with a second circuit breaker connected down-line, and the second curve having been predetermined when a first circuit breaker was connected in series with a second circuit breaker connected down-line.

3. The tripping device according to claim 1, wherein the second quantity is representative of time necessary for a current flowing in a circuit breaker to reach the peak value from a moment such current exceeds a preset low threshold.

4. The tripping device according to claim 1, wherein said function is a step-wise function.

5. The tripping device according to claim 1, wherein said function comprises a linear piece-wise approximation.

6. The tripping device according to claim 1, wherein, for a preset second quantity, the amplitude of the instantaneous tripping threshold increases with a rating of an associated circuit breaker.

7. The tripping device according to claim 1, wherein said processing means further comprises fourth determining means for determining said instantaneous tripping threshold from one of two sets of predetermined values, a first set thereof defining a first curve, applicable when a short-circuit occurs when the processing means are not powered, and from a second set of values defining a second curve applicable when a short-circuit occurs when the processing means are powered, the second curve corresponding to the first curve but displaced along the time-axis relative to the first curve.

8. The tripping device according to claim 1, wherein the means for measuring a current flowing in a circuit breaker comprise at least one linear current sensor.

9. The tripping device according to claim 1, wherein the means for measuring a current flowing in a circuit breaker comprise at least one iron sensor with shunt effect.

* * * * *